United States Patent
Di Nicolantonio

(10) Patent No.: US 6,244,152 B1
(45) Date of Patent: Jun. 12, 2001

(54) SAW BLADE FOR A SAW MACHINE ESPECIALLY AN OSCILLATING SAW MACHINE

(75) Inventor: Aldo Di Nicolantonio, Recherswil (CH)

(73) Assignee: Scintilla AG, Solothurn (CH)

( * ) Notice: Subject to any disclaimer, the term of this patent is extended or adjusted under 35 U.S.C. 154(b) by 0 days.

(21) Appl. No.: 09/168,509

(22) Filed: Oct. 8, 1998

(30) Foreign Application Priority Data

Nov. 21, 1997 (DE) .......................... 291 20 605 U

(51) Int. Cl.[7] .................. B27B 13/02; B27B 33/02
(52) U.S. Cl. .................. 83/835; 83/846; 83/848; 83/854
(58) Field of Search ................ 83/835, 837, 846–55

(56) References Cited

U.S. PATENT DOCUMENTS 4,813,324 * 3/1989 Yoshida et al. ................ 83/848
4,913,022 * 4/1990 Kuklinski ................ 83/849
5,062,338 11/1991 Baker .
5,410,935 * 5/1995 Holston et al. ................ 83/851
5,918,525 * 7/1999 Schramm ................ 83/835

FOREIGN PATENT DOCUMENTS 83 37 937 U       2/1990 (DE) .
296 00 567 U1    11/1996 (DE) .

* cited by examiner

Primary Examiner—M. Rachuba
(74) Attorney, Agent, or Firm—Michael J. Striker

(57) ABSTRACT

The saw blade (30) for an oscillating saw machine has a row of M-shaped twin teeth (38) on its toothed edge (40). Each twin tooth has two tooth tips pointing in opposite directions so as to be effective for sawing in two opposite saw blade motion directions. Each twin tooth is alternately twisted about a central twist axis in one rotation direction or another opposite rotation direction out from the saw blade plane so that the tooth tips of each twisted twin tooth point in opposite directions out from the saw blade plane.

6 Claims, 3 Drawing Sheets

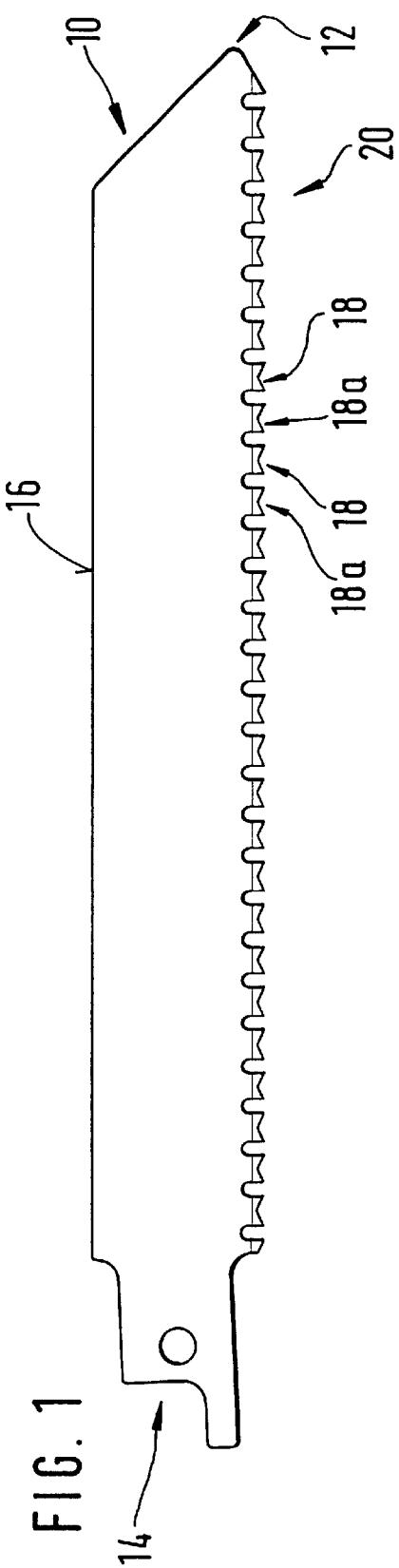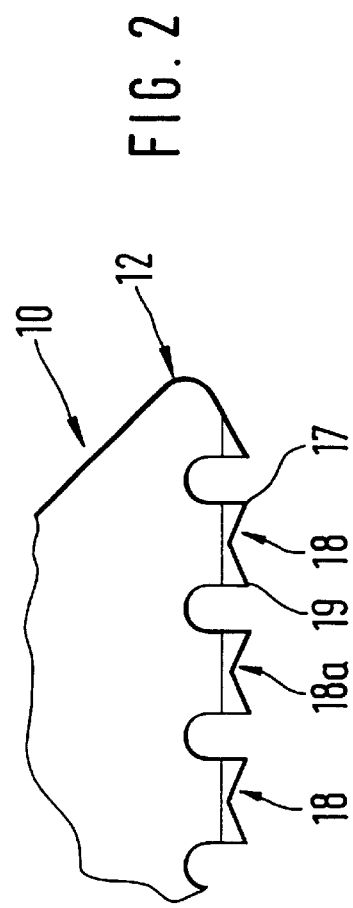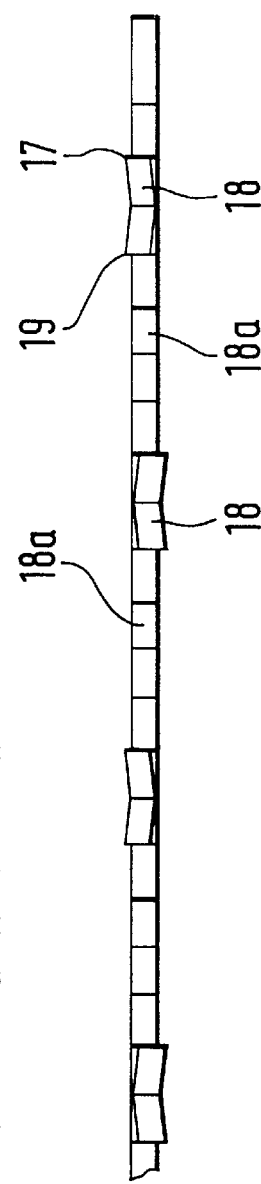

SAW BLADE FOR A SAW MACHINE ESPECIALLY AN OSCILLATING SAW MACHINE

BACKGROUND OF THE INVENTION

1. Field of the Invention

The present invention relates to a saw blade for a saw machine, especially for an oscillating saw machine or power saw, and, more particularly, to a saw blade for a saw machine having M-shaped twin teeth on its toothed edge, of which a plurality are alternately set to one side or the other of the blade plane, wherein each twin tooth has two tooth tips pointing in opposite directions so as to be effective for two opposite saw blade motion directions.

2. Prior Art

A saw blade of the above-described type having a row of twin teeth is described in German Patent Application DE 296 00 567. Each twin tooth has a shape corresponding to a printed letter "M" with two tooth tips. The respective twin teeth are set with both teeth tips alternately pointing left or right of the blade plane and permit an especially rapid sawing action.

A disadvantage of this saw blade is that it contacts with its teeth row on a comparatively large area of a work piece to be sawed because of the alternate set of the twin teeth on both sides and because of that true, centered and straight sawing is difficult.

Another saw blade of this type with M-shaped twin teeth is described in U.S. Pat. No. 5,062,338. The tooth tips of each of the twin teeth are curved outward or set in respective opposite directions again with the disadvantage that comparatively poor centering is provided during sawing.

Furthermore a circular saw blade is known from DE 83 37 937 with M-shaped twin teeth that are set alternating left and right and provide comparatively little centering action during a gripping engagement with a work piece.

SUMMARY OF THE INVENTION

It is an object of the present invention to provide an improved saw blade for a saw machine, especially an oscillating saw machine or power saw, of the above-described type that does not have the above-described disadvantages.

This object, and others that will be made more apparent hereinafter, are attained in a saw blade for a saw machine having M-shaped twin teeth on its toothed edge, a plurality of which are set alternately to either one side or the other of the blade, wherein each twin tooth has two tooth tips pointing in opposite directions so as to be effective for sawing in two opposite saw blade motion directions.

According to the invention, some, but not all, of the twin teeth are not set so as to point alternately to either side of the blade, i.e. out of a longitudinal plane of the saw blade, but instead are centered in the plane of the saw blade.

The saw blade according to the invention has the advantage that it can be centered better during sawing so that comparatively smooth straight cut surfaces are provided with cutting efficiency. The gripping power in both directions of motion of the saw blade is equally good because of the symmetric form of the twin teeth.

Besides improved saw motion guidance the saw blade of the present invention provides improved chip disposal, reduced heat generation and permits a higher sawing speed.

In a preferred embodiment of the invention every other or every second twin tooth encountered while traveling in a longitudinal direction along the saw blade is not set so that its tips point out beyond the longitudinal plane of the saw blade on one side or the other. However the remaining twin teeth are alternatively set and alternately point out of one side or the other of the plane of the saw blade.

In a particularly preferred embodiment the non-set teeth extend out from the saw blade edge further than the set teeth. This feature provides further improvements in the cut surfaces due to even better centering during cutting.

In an alternative embodiment the saw blade includes a plurality of M-shaped twin teeth arranged in succession along a toothed edge of the saw blade. Each twin tooth has two tooth tips pointing in opposite directions so as to be particularly effective for sawing in two opposite saw blade motion directions. The respective twin teeth are alternately twisted about a central twist axis in one rotation direction or another opposite rotation direction out from a saw blade plane so that the tooth tips of each twisted twin tooth point in opposite directions out of the saw blade plane. The center of each twin tooth has a V groove that provides similar centering action as the non-set teeth in the other embodiment of the invention described above.

BRIEF DESCRIPTION OF THE DRAWING

The objects, features and advantages of the present invention will be explained in more detail by the following examples with reference to the drawing in which FIG. 1 is a side view of an elongated saw blade according to the invention with a straight teeth row of alternately set twin teeth and not set, centered twin teeth;

FIG. 2 is a cutaway side view of a portion of the elongated saw blade shown in FIG. 1;

FIG. 3 is a top plan view of the toothed edge of the saw blade according to FIG. 1;

DESCRIPTION OF THE PREFERRED EMBODIMENTS

Figure 4:
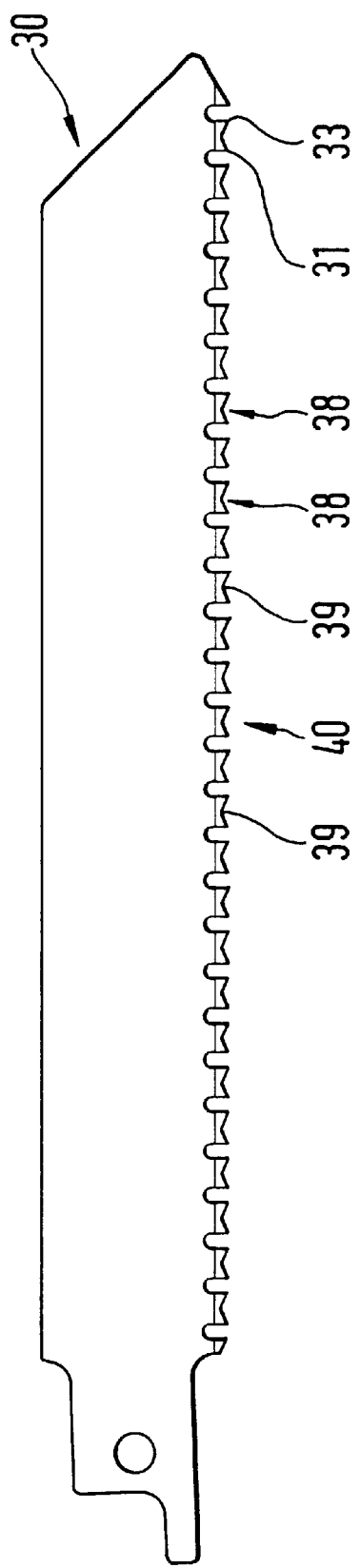
FIG. 4 is side view of an elongated saw blade with a straight teeth row whose twin teeth are arranged crossing the plane of the saw blade rotated about their center with their tooth tips pointing out on opposite sides of the plane of the saw blade.

The saw blade shown in the side view of FIG. 1 has a saw blade tip 12 at its front end, a grip or handle portion 14 at its rear end, a toothed edge 20 underneath and a saw blade back 16 on its upper side. The toothed edge 20 has a plurality of twin teeth 18 each provided with twin tooth tips 17,19. Every second or every other twin tooth 18a as encountered traveling in the longitudinal direction along the row of teeth is not set, i.e. it does not have tips pointing out of the saw blade plane. The first twin teeth 18 each follow a second non-set, centered twin tooth 18a and each have tooth tips that point together either to the left or right of the plane of the saw blade. Furthermore the direction in which the tooth tips of the first twin teeth point out of the saw blade plane alternates as one travels along the row of saw blade teeth in one direction from one first twin tooth to another. The tooth tips 17,19 of the non-set, centered twin teeth 18a extend—as considered in the plane of the saw blade—either further outward or downward than the set twin teeth 18 so that they come to grips with the work piece sooner than the set teeth 18. Because of that a centering effect due to the centered non-set teeth 18*a* results that provides easy penetration of the work piece and a precise cut along the saw blade plane. Without the non-set centered teeth 18*a* the saw blade wanders and thus is uncontrollable which leads to an oblique cut.

FIG. 2 shows an enlarged portion of the saw blade tip 12 and clearly shows the M-shape of each twin tooth 18,18*a*.

FIG. 3 shows a plan bottom view of the toothed edge 20 of the saw blade 10. This saw blade 10 has an alternating arrangement of set teeth 18 and non-set twin teeth 18*a*. In other words, a non-set tooth 38*a* is encountered immediately after each set tooth 38 when one travels in one direction along the row of saw blade teeth. Also the set teeth 18, i.e. those teeth whose tips 19,17 point out of the plane of the saw blade, alternately point either to the left or right of the plane of the saw blade as one travels along the saw teeth row.

FIG. 4 shows a straight saw blade 30 with M-shaped twin teeth 38 with teeth tips 31,33 arranged on the toothed edge 40, whose tooth tips 31,33 are rotatably set out of the blade plane or twisted about a center axis of each twin tooth alternately in respective opposite rotation or twist directions. The center 39 of these M-shaped teeth forms a V-groove between the tooth tips extending transversely to the sawing direction because of this offset, by which the saw blade is centered on the work piece during sawing.

Figure 5:
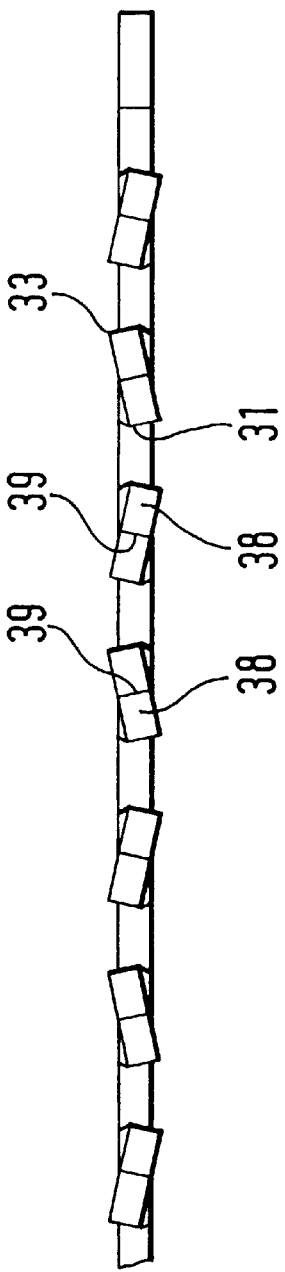
FIG. 5 is plan view of the toothed edge of the saw blade according to FIG. 4.

FIG. 5 shows a plan view of the saw bottom edge according to the embodiment of FIG. 4 and clearly illustrates the twist or rotation of the individual twin teeth 38 in alternate rotation directions from the plane of the saw blade, i.e. alternately set by rotation.

Figure 6:
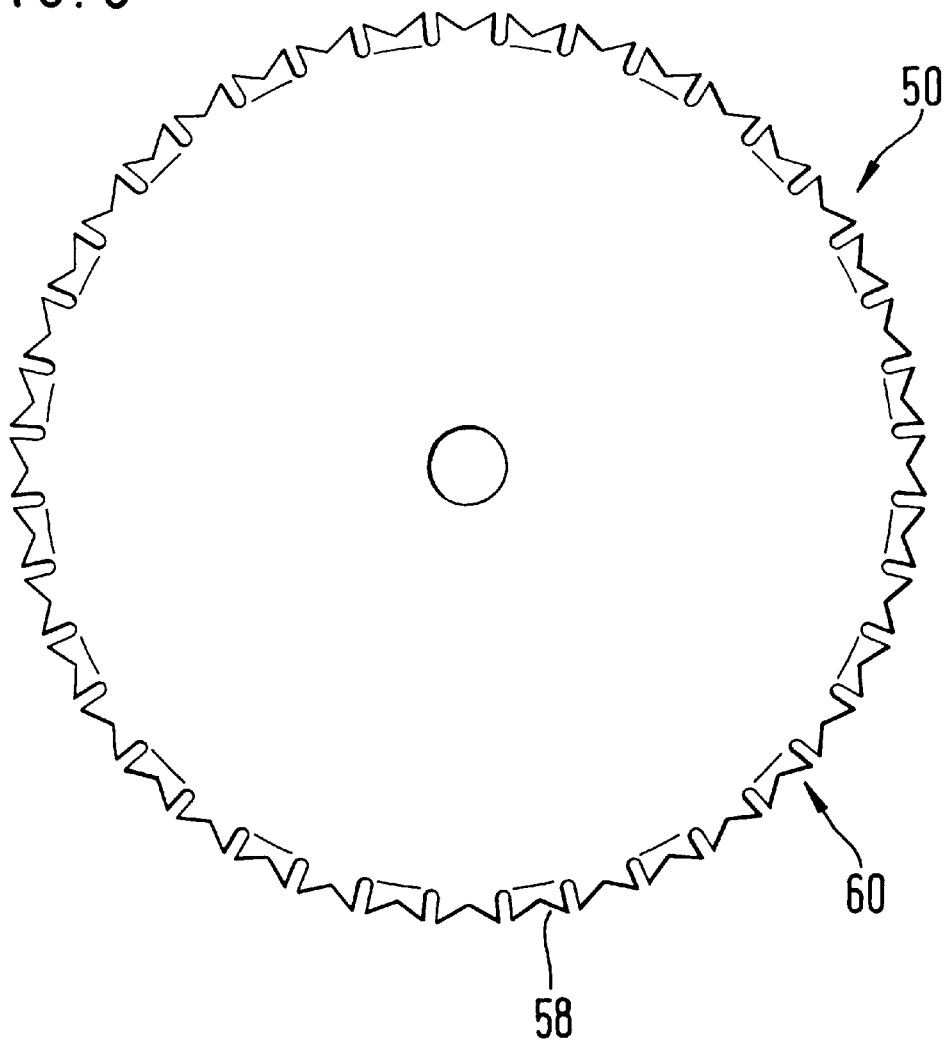
FIG. 6 is a side view of a circular saw blade having a teeth geometry as in the example of FIG. 1.

FIG. 6 shows a circular saw blade 50 with a toothed edge 60 comprising twin teeth 58, 58*a* with a tooth geometry according to FIG. 1, which operates as described in connection with FIG. 1.

Figure 7:
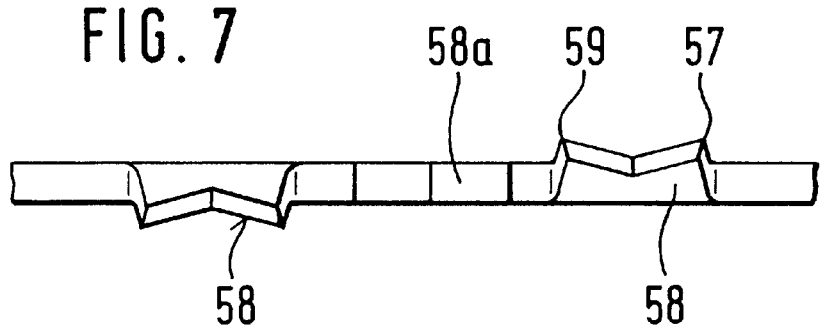
FIG. 7 is plan view of the teeth of the saw blade according to FIG. 6.

FIG. 7 shows an enlarged view of the toothed edge 60 of the saw blade 50. The set teeth 58 bent out of the plane of the saw blade and the non-set, centered teeth 58*a* in the plane of the saw blade are clearly indicated in this Figure. Both tips 57,59 of each M-shaped set tooth 58 point out of the saw blade plane alternately either to the left or right of the saw blade plane as one travels along the saw teeth row as in the embodiment shown in FIGS. 1 to 3.

In a saw blade embodiment according to the invention that is not shown here the strength of the material used for the saw teeth in the saw blade differs according to the purpose of the saw blade teeth, for example by making some of the teeth from a hardened metal. In this unshown embodiment some, i.e. the stronger saw teeth, project or extend more than the weaker saw teeth out of the saw blade plane. Thus the weaker saw blade teeth can be made from the saw blade material and extend further down beyond the contour of the saw blade than the stronger teeth.

The above-described present invention is also described in German Patent Application 297 20 605.2 of Nov. 21, 1997. The subject matter of this German Application is hereby incorporated herein by reference.

I claim:

1. A saw blade for a saw machine, wherein said saw blade (30) comprises a plurality of M-shaped twin teeth (38) arranged in succession along a toothed edge (40) of the saw blade, wherein each of said twin teeth has two tooth tips pointing in opposite directions so as to be effective for sawing in two opposite saw blade motion directions and each of said twin teeth is alternately twisted about a central twist axis in one rotation direction or another opposite rotation direction out from a saw blade plane so that said tooth tips of each of said twisted twin teeth point in opposite directions out of the saw blade plane.

2. The saw blade as defined in claim 1, wherein said twin teeth have equal dimensions.

3. The saw blade as defined in claim 1, that is elongated or straight.

4. The saw blade as defined in claim 1, comprising a circular saw blade.

5. The saw blade as defined in claim 1, wherein each of said twin teeth goes over into an adjacent one of the twin teeth by a concave contour.

6. The saw blade as defined in claim 1, comprising a bimetal or trimetal blade.

\* \* \* \* \*